United States Patent [19]

Koga et al.

[11] Patent Number: 4,481,124
[45] Date of Patent: Nov. 6, 1984

[54] THERMAL SHOCK RESISTANT POROUS SOUND ABSORBING BODY

[75] Inventors: Shosuke Koga, Owariasahi; Mitsuru Koketsu, Nagoya; Yoshihiro Ohta, Nagoya; Seigo Satomi, Nagoya, all of Japan

[73] Assignee: NGK Insulators, Ltd., Nagoya, Japan

[21] Appl. No.: 456,356

[22] Filed: Jan. 7, 1983

[51] Int. Cl.³ .................. C04B 43/00; E04B 1/74
[52] U.S. Cl. ................................ 252/62; 501/80
[58] Field of Search .......................... 252/62; 501/80

[56] References Cited

U.S. PATENT DOCUMENTS

| | | | |
|---|---|---|---|
| 3,488,723 | 1/1970 | Veazie | 252/62 |
| 3,950,175 | 4/1976 | Lachman et al. | 501/80 |
| 3,954,672 | 5/1976 | Sommers et al. | 502/80 |
| 3,958,582 | 5/1976 | Noda et al. | 252/62 |
| 3,991,254 | 11/1976 | Takeuchi | 501/80 |
| 4,280,845 | 7/1981 | Matnikisa et al. | 501/43 |

FOREIGN PATENT DOCUMENTS

| | | |
|---|---|---|
| 53-145816 | 12/1978 | Japan . |
| 54-7411 | 1/1979 | Japan . |
| 54-100409 | 8/1979 | Japan . |
| 1497379 | 1/1978 | United Kingdom . |
| 477984 | 11/1975 | U.S.S.R. . |
| 554213 | 4/1977 | U.S.S.R. . |

OTHER PUBLICATIONS

The Journal of the Acoustical Society of America, vol. 19, No. 4, Jul. 1947, "Acoutical Properties of Homogeneous, Isotropic Rigid Tiles and Flexible Blankets", by Leo L. Beranek.

Primary Examiner—Paul Lieberman
Assistant Examiner—Hoa Van Le
Attorney, Agent, or Firm—Parkhurst & Oliff

[57] ABSTRACT

A thermal shock resistant porous sound absorbing body having high durability in which the prior drawbacks of sound absorbing bodies have been obviated, is produced by sintering a mixture comprising 100 parts by volume of ceramic particles having a bulk density of 1.2–2.0 kg/l, a grain size of 0.3–4.0 mm, a thermal expansion coefficient of less than $70 \times 10^{-7}/°$ C. and a fire resistant temperature of higher than 1,000° C. and 4–18 parts by volume of an inorganic binder having a melting temperature of lower than that of the ceramic particles and a thermal expansion coefficient of lower than that of the ceramic particles, and further a sizing agent.

23 Claims, No Drawings

THERMAL SHOCK RESISTANT POROUS SOUND ABSORBING BODY

BACKGROUND OF THE INVENTION

1. Field of the Invention

The present invention relates to sound absorbing bodies to be used for walls, devices and the like which prevent noises caused from roads, factories and the like and particularly to sound absorbing bodies used for mufflers which absorb noises from exhaust ports of combustion gas having a high temperature or vapor.

2. Description of the Prior Art

Heretofore, as sound absorbing bodies housed in mufflers provided in exhaust ports of combustion gas, vapor and the like, use has been made of fibrous sound absorbing bodies, such as glass wool, rock wool sound absorbing bodies and the like. Into these mufflers, is flowed a gas flow having a high temperature and a high speed, which contains contaminative substances, such as various chemicals and dusts and the fibrous sound absorbing body of glass wools, etc. has drawbacks that an organic binder (resin) is deteriorated due to chemicals or high temperature, fibers are scattered by a gas flow of a high speed and chemicals or dusts are adsorbed to lower the sound absorptivity, and particularly when contaminative substances are adsorbed, it is impossible to effect washing without damaging the sound absorbing body, so that said body must be replaced.

For obviating such drawbacks, it has been effected to protect the fibrous sound absorbing body surface with a perforated metal sheet, a metal wire or a glass cloth but it has been difficult to completely prevent the above described drawbacks and the protecting material itself may be deteriorated, so that the object cannot be fully satisfied.

SUMMARY OF THE INVENTION

An object of the present invention is to obviate the drawback that in the sound absorbing body housed in a muffler for a gas flow having a high temperature and a high speed, prior fibrous sound absorbing bodies are deteriorated owing to heat, gas flow and contaminative substances and are scattered and the performance is lowered.

More particularly, an object of the present invention is to provide an inorganic porous sound absorbing body having excellent thermal shock resistance, strength, durability, sound absorptivity, which is obtained by sintering at a high temperature ceramic particles having given ranges of bulk density, grain size, thermal expansion coefficient and fire resistant temperature and an inorganic binder having given ranges of melting temperature and thermal expansion coefficient.

The thermal shock resistant porous sound absorbing body according to the present invention is inorganic materials sintered at a high temperature and therefore is not deteriorated by contaminative substances, such as chemicals, dusts and the like, and by a high temperature and said body is a rigid body, so that the particles are not scattered by a gas flow of a high speed and even if contaminative substances are stuck, such substances can be washed away without damaging the sound absorbing body, so that the sound absorptivity can be rapidly recovered and the thermal expansion coefficient is limited within the given range, so that the sound absorbing body is not broken by rapid heating and rapid quenching and can be used for a long period of time.

DESCRIPTION OF THE PREFERRED EMBODIMENTS

The thermal shock resistant porous sound absorbing body according to the present invention is a sintered porous body composed of 100 parts by volume of ceramic particles and 4-18 parts by volume of an inorganic binder, said ceramic particles having a bulk density of 1.2-2.0 kg/l, a grain size of 0.3-4.0 mm, a thermal expansion coefficient of less than $70 \times 10^{-7}$/°C. and a fire resistant temperature of higher than 1,000° C. and said inorganic binder having a melting temperature which is lower than that of the ceramic particles and a thermal expansion coefficient which is lower than that of the ceramic particles. Said body has such a structure that the ceramic particle surface is covered with the inorganic binder and is connected with one another through the inorganic binder thereby forming a matrix portion, and there are pores connecting front and back of the sintered porous body between respective ceramic particles and the porosity is preferably 35-45% and the bulk specific gravity is preferably 1.2-2.0.

The thermal shock resistant porous sound absorbing body according to the present invention has excellent sound absorptivity, thermal shock resistance, resistance against contaminative substances, such as chemicals and the like, weather resistance, water proofness, fire resistance and the like due to skillful combination of the grain size and thermal expansion coefficient of the ceramic particles and the thermal expansion coefficient of the inorganic binder, so that said sound absorbing body can be used as the body housed in mufflers for gas flow having a high temperature and a high speed of exhaust vapor and exhaust gas of power plant boiler or various engine exhaust gases and as sound absorbing bodies for any field, such as for interior finishes of sound proof chambers, buildings and the like or for sound proof walls of roads, railways and the like.

Ceramic particles to be used in the present invention include crushed and screened product of ceramic fired substances of feldspar-, zircon-, cordierite-, alumina-, aluminum-titanate-ceramics, porcelains, refractories, refractory bricks and the like, or products obtained by granulating or crushing raw batch of the above described ceramics and then fired and screened, in which the bulk density, grain size, thermal expansion coefficient and fire resistant temperature are within the given limited ranges, and the shape may be any of polygon and sphere.

The production of ceramic particles from ceramic fired product is as follows. Ceramic fired product is crushed by a crusher, such as an impeller breaker and then supplied to a vibrating sieve provided with two screens having a larger open (upper stage) and a smaller open (lower stage) and ceramic particles passed through the upper stage of screen and collected on the lower stage of screen are recovered.

The production of ceramic particles from raw batch of ceramics is as follows. That is, ceramic raw batch powders are granulated by a pan type granulator while adding moisture and dried to obtain particles or a dried ceramic raw batch is crushed into particles having a given size. The thus obtained particles are fired in a tunnel furnace and the fired particles are supplied to the vibrating sieve and screened.

Inorganic binders to be used in the present invention are glass or glazes consisting of acidic oxides, such as $SiO_2$, $B_2O_3$, etc., neutral oxides, such as $Al_2O_3$, $TiO_3$, etc. and basic oxides, such as $Na_2O$, $K_2O$, etc. which have a melting temperature lower than that of ceramic particles and a thermal expansion coefficient of lower than that of ceramic particles and melt at a high temperature and react and bond with ceramic particles. The term "melting temperature" used herein includes "softening temperature".

Inorganic binders are produced as follows. The above described starting materials are roughly crushed with a jaw crusher and the like and then compounded and finely milled with a wet ball mill and then mixed and dried and pulverized by a pulverizer into 0.5 mm.

The thermal shock resistant porous sound absorbing body according to the present invention may be colored by adding pigments, such as $Fe_2O_3$, $MnO_2$, etc. to the inorganic binder.

The sound absorbing body of the present invention is produced by mixing the above described ceramic particles and inorganic binder together with a sizing agent in given amounts to apply the inorganic binder and the sizing agent on ceramic particle surface.

The sizing agent is an organic substance, by which the inorganic binder is adhered on ceramic particle surface and the moldability and the green strength are given and which is burnt off when firing, and starch, dextrin, PVA, CMC and the like are preferable. The sizing agent is previously dissolved in water into a concentration of 40–60% and then used.

The mixing ratio is preferred to be 4–18 parts by volume of the inorganic binder and 3–12 parts by volume of the aqueous solution of a sizing agent to 100 parts by volume of ceramic particles. The mixing is effected by supplying the ceramic particles and the inorganic binder by means of a mixer, such as a dish type mixer and V-type mixer and preliminarily mixing the mixture and then adding the aqueous solution of the sizing agent and mixing the resulting mixture. It is preferable that the mixture is passed through a metal screen to separate the particles.

The molding of a porous body is effected as follows. The mixture is weighed and charged in a mold having the given size to which a mold release agent is applied and the mold is previously uniformly filled with the mixture by using a rammer and the like and then a vibrating pressure or a pressure is applied thereto to form a porous body. The density of the shaped article can be adjusted by the weight of the mixture filled in the mixture per the inner volume of the mold. Various forms of shaped articles may be obtained by using plane plate-, cylinder-, box- and other formed molds.

The mold separation may be easily effected by taking out the shaped article together with a plate placed in the mold or reversing the mold.

The shaped article is dried under the state where it is mounted on the plate. The strength of the sizing agent is developed by drying, so that the manual handling becomes easy. The dried article is mounted on a refractory plate of silicon carbide, silicon nitride and the like on which silica, alumina powders are dispersed and fired in a tunnel furnace at a temperature which is higher than a melting temperature of the inorganic binder and is lower than a melting temperature of the ceramic particles.

The inorganic binder on ceramic particle surface is melted by the firing and bonds with the ceramic particles and the ceramic particles are connected with one another to form an inorganic thermal shock resistant sound absorbing body. The sizing agent is burnt off when firing and the role is finished.

The bulk specific gravity and the porosity of the thermal shock resistant porous sound absorbing body of the present invention can be adjusted by controlling the bulk density and grain size of ceramic particles, the amount of the inorganic binder mixed, the weight of the mixture filled in the mold when molding but the bulk specific gravity is preferred to be 1.2–2.0 in view of the bend strength and the weight of the product and the porosity is preferred to be 35–45% in order to ensure the high sound absorptivity. The thermal expansion coefficient may be controlled by selecting that of the ceramic particles and the inorganic binder but the value is preferred to be less than $70 \times 10^{-7}/°C$. in view of the thermal shock resistance.

The bulk density of the ceramic particles according to the present invention is defined to be 1.2–2.0 kg/l based on the following reason. When said value is less than 1.2 kg/l, the strength of the product is reduced and there is problem in view of use and when said value exceeds 2.0 kg/l, the weight of the product becomes higher resulting in difficulty of handling and planning of muffler.

The definition of the grain size of the ceramic particles being 0.3–4.0 mm is based on the following reason. When the ceramic particles having a grain size of less than 0.3 mm are mixed, the porosity and the pore diameter of the product becomes smaller and the pores are clogged and the sound absorptivity is lowered and when the ceramic particles having a grain size of more than 4.0 mm are mixed, the porosity and the pore diameter of the product become larger and the sound absorptivity of the product is lowered.

The definition of the thermal expansion coefficient of the ceramic particles of less than $70 \times 10^{-7}/°C$. is based on the following reason. When said coefficient exceeds $70 \times 10^{-7}/°C$., the product is readily broken due to the heat stress generated when rapid heating and rapid quenching, and the thermal shock resistance is lowered.

The definition of the fire resistant temperature of the ceramic particles of higher than 1,000° C. is because the highest temperature of gas flow in muffler for a gas flow having a high temperature is about 600° C. and a temperature of higher than 1,000° C. is necessary for providing the fire resisting performance as an interior finish materials of buildings.

Furthermore, in the present invention, it is necessary for obtaining the best bonding state of the ceramic particles and the inorganic binder that the thermal expansion coefficient of the inorganic binder is lower than that of the ceramic particles and if the thermal expansion coefficient of the inorganic binder is higher than that of the ceramic particles, cracks are formed in the inorganic binder and the strength and the thermal shock resistance are reduced.

In addition, it is necessary for melting only the inorganic binder and bonding the ceramic particles in a porous form without melting and deforming the ceramic particles, that the melting temperature of the inorganic binder is lower than that of the ceramic particles.

The definition of amount of 4–18 parts by volume of the inorganic binder mixed to 100 parts by volume of the ceramic particles is based on the following reason. When said amount is less than 4 parts by volume, the amount of the binder is deficient and the good bonding state is not obtained and the strength is low, while when said amount exceeds 18 parts by volume, the amount of the binder becomes excessive and the pores of the product are clogged and the sound absorptivity is lowered.

The following examples are given for the purpose of illustration of this invention and are not intended as limitations thereof.

EXAMPLE

To 100 parts by volume of ceramic particles having the bulk density, grain size, thermal expansion coefficient and fire resistant temperature shown in the following Table 1 were added the amount shown in Table 1 of inorganic binders having the thermal expansion coefficient and melting temperature shown in Table 1 and an aqueous solution of starch as a sizing agent and the resulting mixture was mixed for 5 minutes by a mixer and then the mixture was weighed into a necessary amount and charged into a mold for a plane plate of 300×300 mm which was applied with a mold release oil, and made even, after which an upper mold was set and the charged mixture was shaped with a vibrating pressure molding machine so that the thickness became 20 mm.

Then, the shaped article was separated from the mold in the state where the shaped article was mounted on the plate previously placed in the mold and mounted on a drier car and dried in a drying chamber at 50° C. for 24 hours. The dried shaped article was mounted on a silicon carbide refractory plate on which alumina powders were dispersed, and sintered at the temperature described in Table 1 in a single furnace to obtain thermal shock resistant porous sound absorbing bodies of the present invention (Nos. 1–16).

Reference sample Nos. 17–26 which are beyond the limited value of the present invention and prior sound absorbing bodies of a glass wool sound absorbing body (No. 27), a rock wool sound absorbing body (No. 28) and a sound absorbing body (No. 29) formed by bonding ceramic particles with polyester resin, were produced.

These sound absorbing bodies were measured with respect to bulk specific gravity, porosity, thermal expansion coefficient from room temperature to 800° C. and bend strength when a span is 270 mm and with respect to sound absorptivity of 100–2,000 Hz following to JIS A1405 "Methods of Test for Sound Absorption of Acoustical Materials by the Tube Method" and the peak value and the average of 250–1,000 Hz were determined.

These sound absorbing bodies having actual size were set in a thermal shock tester and the thermal shock test in which a gas flow of a temperature of 600° C. and a gas speed of 20 m/s and a gas flow of a temperature of 20° C. and a gas speed of 20 m/s were applied 100 cycles at each interval of 15 minutes.

The obtained results are shown in Table 1 and the articles produced in the present invention are the sound absorbing bodies having excellent thermal shock resistance, strength and sound absorptivity and are inorganic materials sintered at a high temperature, so that they have excellent properties in view of weather resistance, water proofness, fire resistance and the like and can be used as mufflers for a gas flow having a high temperature and sound absorbing bodies for preventing various noise pollutions for interior finish, exterior finish and the like and are very commercially useful.

TABLE 1

| | | Condition | | | | | | | |
|---|---|---|---|---|---|---|---|---|---|
| | | Ceramic particles | | | | Inorganic binder | | Mixed ratio | |
| | No. | Bulk density (kg/l) | Grain size (mm) | Thermal expansion coefficient (/°C.) | Fire resistant temperature (°C.) | Thermal expansion coefficient (/°C.) | Melting point (°C.) | Ceramic particles (parts by volume) | Inorganic binder (parts by volume) | Sintering temperature (°C.) |
| Present invention | 1 | 1.20 | 0.3–2.0 | $60 \times 10^{-7}$ | 1,700 | $47 \times 10^{-7}$ | 1,100 | 100 | 12 | 1,150 |
| | 2 | 1.45 | 0.8–3.4 | $52 \times 10^{-7}$ | 1,650 | $29 \times 10^{-7}$ | 1,200 | 100 | 12 | 1,250 |
| | 3 | 1.45 | 0.3–2.0 | $52 \times 10^{-7}$ | 1,650 | $29 \times 10^{-7}$ | 1,200 | 100 | 12 | 1,250 |
| | 4 | 1.63 | 0.3–2.0 | $8 \times 10^{-7}$ | 1,750 | $4 \times 10^{-7}$ | 1,240 | 100 | 12 | 1,270 |
| | 5 | 1.63 | 0.3–2.0 | $15 \times 10^{-7}$ | 1,730 | $10 \times 10^{-7}$ | 1,250 | 100 | 12 | 1,280 |
| | 6 | 1.40 | 0.3–2.0 | $32 \times 10^{-7}$ | 1,450 | $23 \times 10^{-7}$ | 1,150 | 100 | 12 | 1,200 |
| | 7 | 1.86 | 0.3–2.0 | $48 \times 10^{-7}$ | 1,470 | $29 \times 10^{-7}$ | 1,200 | 100 | 12 | 1,250 |
| | 8 | 1.40 | 0.3–2.0 | $62 \times 10^{-7}$ | 1,620 | $50 \times 10^{-7}$ | 1,170 | 100 | 12 | 1,210 |
| | 9 | 1.25 | 0.3–2.0 | $67 \times 10^{-7}$ | 1,720 | $50 \times 10^{-7}$ | 1,170 | 100 | 12 | 1,210 |
| | 10 | 2.00 | 0.3–2.0 | $70 \times 10^{-7}$ | 1,750 | $55 \times 10^{-7}$ | 1,130 | 100 | 12 | 1,160 |
| | 11 | 1.45 | 0.3–2.0 | $52 \times 10^{-7}$ | 1,650 | $23 \times 10^{-7}$ | 1,200 | 100 | 12 | 1,250 |
| | 12 | 1.45 | 0.3–2.0 | $52 \times 10^{-7}$ | 1,650 | $50 \times 10^{-7}$ | 1,170 | 100 | 12 | 1,210 |
| | 13 | 1.45 | 0.3–2.0 | $52 \times 10^{-7}$ | 1,650 | $29 \times 10^{-7}$ | 1,200 | 100 | 4 | 1,250 |
| | 14 | 1.45 | 0.3–2.0 | $52 \times 10^{-7}$ | 1,650 | $29 \times 10^{-7}$ | 1,200 | 100 | 18 | 1,250 |
| | 15 | 1.35 | 0.3–4.0 | $52 \times 10^{-7}$ | 1,650 | $29 \times 10^{-7}$ | 1,200 | 100 | 12 | 1,250 |
| | 16 | 1.48 | 0.3–1.5 | $52 \times 10^{-7}$ | 1,650 | $29 \times 10^{-7}$ | 1,200 | 100 | 12 | 1,250 |
| Reference sample | 17 | 1.01 | 0.3–2.0 | $65 \times 10^{-7}$ | 1,400 | $47 \times 10^{-7}$ | 1,100 | 100 | 12 | 1,150 |
| | 18 | 1.65 | 0.1–2.0 | $52 \times 10^{-7}$ | 1,650 | $29 \times 10^{-7}$ | 1,200 | 100 | 12 | 1,250 |
| | 19 | 1.63 | 0.1–4.8 | $52 \times 10^{-7}$ | 1,650 | $29 \times 10^{-7}$ | 1,200 | 100 | 12 | 1,250 |
| | 20 | 1.30 | 0.3–5.7 | $52 \times 10^{-7}$ | 1,650 | $29 \times 10^{-7}$ | 1,200 | 100 | 12 | 1,250 |
| | 21 | 1.25 | 2–4.8 | $52 \times 10^{-7}$ | 1,650 | $29 \times 10^{-7}$ | 1,200 | 100 | 12 | 1,250 |
| | 22 | 1.45 | 0.3–2.0 | $52 \times 10^{-7}$ | 1,650 | $62 \times 10^{-7}$ | 1,170 | 100 | 12 | 1,250 |
| | 23 | 1.45 | 0.3–2.0 | $52 \times 10^{-7}$ | 1,650 | $29 \times 10^{-7}$ | 1,200 | 100 | 2 | 1,250 |
| | 24 | 1.45 | 0.3–2.0 | $52 \times 10^{-7}$ | 1,650 | $29 \times 10^{-7}$ | 1,200 | 100 | 22 | 1,250 |
| | 25 | 1.80 | 0.3–2.0 | $80 \times 10^{-7}$ | 1,630 | $50 \times 10^{-7}$ | 1,170 | 100 | 12 | 1,210 |
| | 26 | 1.91 | 0.3–2.0 | $88 \times 10^{-7}$ | 1,690 | $59 \times 10^{-7}$ | 1,100 | 100 | 12 | 1,150 |
| Prior sample | 27 | Sound absorbing body made of glass wool | | | | | | | | |
| | 28 | Sound absorbing body made of rock wool | | | | | | | | |
| | 29 | Sound absorbing body formed by bonding ceramic particles with resin | | | | | | | | |

| Properties of thermal shock resistant porous sound absorbing body | |
|---|---|
| Thermal shock | Sound absorptivity |

TABLE 1-continued

| | No. | Bulk specific gravity | Porosity (%) | Thermal expansion coefficient (/°C.) | resistance Test of heating at 600° C. and cooling at 20° C. | Bend strength (kg/cm$^2$) | Peak value (%) | Average value of 250–1,000 Hz (%) |
|---|---|---|---|---|---|---|---|---|
| Present invention | 1 | 1.25 | 40 | $61 \times 10^{-7}$ | Not vary | 46 | 96 | 85 |
| | 2 | 1.49 | 43 | $44 \times 10^{-7}$ | Not vary | 66 | 98 | 81 |
| | 3 | 1.50 | 41 | $46 \times 10^{-7}$ | Not vary | 70 | 96 | 86 |
| | 4 | 1.68 | 39 | $7 \times 10^{-7}$ | Not vary | 95 | 96 | 84 |
| | 5 | 1.69 | 40 | $14 \times 10^{-7}$ | Not vary | 90 | 96 | 86 |
| | 6 | 1.46 | 41 | $30 \times 10^{-7}$ | Not vary | 70 | 95 | 84 |
| | 7 | 1.90 | 40 | $44 \times 10^{-7}$ | Not vary | 115 | 95 | 85 |
| | 8 | 1.45 | 40 | $58 \times 10^{-7}$ | Not vary | 66 | 96 | 86 |
| | 9 | 1.30 | 39 | $62 \times 10^{-7}$ | Not vary | 52 | 94 | 81 |
| | 10 | 2.05 | 41 | $66 \times 10^{-7}$ | Not vary | 120 | 95 | 84 |
| | 11 | 1.50 | 40 | $45 \times 10^{-7}$ | Not vary | 69 | 96 | 85 |
| | 12 | 1.48 | 39 | $52 \times 10^{-7}$ | Not vary | 66 | 96 | 86 |
| | 13 | 1.49 | 42 | $48 \times 10^{-7}$ | Not vary | 40 | 96 | 84 |
| | 14 | 1.56 | 37 | $43 \times 10^{-7}$ | Not vary | 84 | 86 | 73 |
| | 15 | 1.38 | 45 | $44 \times 10^{-7}$ | Not vary | 54 | 95 | 76 |
| | 16 | 1.53 | 35 | $46 \times 10^{-7}$ | Not vary | 75 | 84 | 75 |
| Reference sample | 17 | 1.05 | 39 | $61 \times 10^{-7}$ | Not vary | 25 | 96 | 85 |
| | 18 | 1.70 | 32 | $48 \times 10^{-7}$ | Not vary | 92 | 65 | 48 |
| | 19 | 1.68 | 33 | $47 \times 10^{-7}$ | Not vary | 87 | 69 | 51 |
| | 20 | 1.33 | 48 | $45 \times 10^{-7}$ | Not vary | 55 | 88 | 52 |
| | 21 | 1.28 | 50 | $44 \times 10^{-7}$ | Not vary | 50 | 90 | 48 |
| | 22 | 1.50 | | | (Crack are formed in sintering) | | | |
| | 23 | 1.46 | 43 | $49 \times 10^{-7}$ | Not vary | 20 | 98 | 82 |
| | 24 | 1.63 | 34 | $41 \times 10^{-7}$ | Not vary | 102 | 68 | 53 |
| | 25 | 1.84 | 40 | $78 \times 10^{-7}$ | Broken | 107 | 95 | 83 |
| | 26 | 1.95 | 39 | $83 \times 10^{-7}$ | Broken | 114 | 96 | 85 |
| Prior sample | 27 | — | — | — | Scattering of fibers | — | 95 | 90 |
| | 28 | — | — | — | Scattering of fibers | — | 94 | 89 |
| | 29 | 1.5 | 40 | — | Drop of particle | 25 | 95 | 84 |

What is claimed is:

1. A thermal shock resistant porous sound absorbing body comprising:
   ceramic particles, approximately 100 parts by volume, having a bulk density between 1.2 g/cm$^3$ and 2.0 g/cm$^3$, a grain size distribution between 0.3 mm and 4.0 mm, a thermal expansion coefficient of less than $70 \times 10^{-7}$/°C. and a fire resistant temperature greater than 1,000° C.;
   an inorganic binder, approximately 4 to 18 parts by volume, having a melting temperature lower than a melting temperature of the ceramic particles and a thermal expansion coefficient lower than the thermal expansion coefficient of the ceramic particles, the inorganic binder forming a matrix portion substantially around and substantially between the ceramic particles, resulting in the sound absorbing body having a 35 to 45 volume percent porosity.

2. The thermal shock resistant porous sound absorbing body of claim 1, wherein the body has a bulk specific gravity between 1.2 and 2.0.

3. The thermal shock resistant porous sound absorbing body of claim 1, wherein the ceramic particles are selected from a group consisting of feldspar, zircon, cordierite, alumina, aluminum-titanate-ceramics, porcelains, refractories, and refractory bricks.

4. The thermal shock resistant porous sound absorbing body of claim 1, wherein the inorganic binder, such as a glass or glaze, is chosen from a group consisting of acidic oxides, neutral oxides and basic oxides.

5. The thermal shock resistant porous sound absorbing body of claim 4, wherein the acidic oxides are selected from a group consisting of SiO$_2$ and TiO$_2$.

6. The thermal shock resistant porous sound absorbing body of claim 4, wherein the neutral oxides are selected from a group consisting of Al$_2$O$_3$ and B$_2$O$_3$.

7. The thermal shock resistant porous sound absorbing body of claim 4, wherein the basic oxides are selected from a group consisting of Na$_2$O and K$_2$O.

8. The thermal shock resistant porous sound absorbing body of claim 1, wherein a sizing agent is mixed with the ceramic particles and the inorganic binder to hold the same together before the formation of the matrix portion.

9. The thermal shock resistant porous sound absorbing body of claim 8, wherein the sizing agent is selected from a group consisting of starch, dextrin, PVA and CMC.

10. The thermal shock resistant porous sound absorbing body of claim 9, wherein the sizing agent is dissolved in water forming a concentration of 40 to 60%.

11. The thermal shock resistant porous sound absorbing body of claim 9, wherein approximately 3 to 12 parts by volume of the dissolved sizing agent mixture is added to the ceramic particles and inorganic binder.

12. A thermal shock resistant porous sound absorbing body comprising:
   ceramic particles, approximately 100 parts by volume, having a bulk density between 1.2 g/cm$^3$ and 2.0 g/cm$^3$, a grain size distribution between 0.3 mm and 2.0 mm, a thermal expansion coefficient of less than $70 \times 10^{-7}$/°C. and a fire resistant temperature greater than 1,000° C.;
   an inorganic binder, approximately 4 to 18 parts by volume, having a melting temperature lower than a melting temperature of the ceramic particles and a thermal expansion coefficient lower than the thermal expansion coefficient of the ceramic particles, the inorganic binder forming a matrix portion substantially around and substantially between the ceramic particles, resulting in the sound absorbing body having a 35 to 45 volume percent porosity.

13. The thermal shock resistant porous sound absorbing body of claim 12, wherein the body has a bulk specific gravity between 1.2 and 2.0.

14. The thermal shock resistant porous sound absorbing body of claim 12, wherein the ceramic particles are selected from a group consisting of feldspar, zircon, cordierite, alumina, aluminum-titanate-ceramics, porcelains, refractories, and refractory bricks.

15. The thermal shock resistant porous sound absorbing body of claim 12, wherein the inorganic binder, such as a glass or glaze, is chosen from a group consisting of acidic oxides, neutral oxides and basic oxides.

16. The thermal shock resistant porous sound absorbing body of claim 15, wherein the acidic oxides are selected from a group consisting of $SiO_2$ and $TiO_2$.

17. The thermal shock resistant porous sound absorbing body of claim 15, wherein the neutral oxides are selected from a group consisting of $Al_2O_3$ and $B_2O_3$.

18. The thermal shock resistant porous sound absorbing body of claim 15, wherein the basic oxides are selected from a group consisting of $Na_2O$ and $K_2O$.

19. The thermal shock resistant porous sound absorbing body of claim 12, wherein the inorganic binder is colored by pigments selected from the group consisting of $Fe_2O_3$ and $M_nO_2$.

20. The thermal shock resistant porous sound absorbing body of claim 12, wherein a sizing agent is mixed with the ceramic particles and the inorganic binder to hold the same together before the formation of the matrix portion.

21. The thermal shock resistant porous sound absorbing body to claim 20, wherein the sizing agent is selected from a group consisting of starch, dextrin, PVA and CMC.

22. The thermal shock resistant porous sound absorbing body of claim 21, wherein the sizing agent is dissolved in water forming a concentration of 40 to 60%.

23. The thermal shock resistant porous sound absorbing body of claim 21, wherein approximately 3 to 12 parts by volume of the dissolved sizing agent mixture is added to the ceramic particles and inorganic binder.

* * * * *